No. 892,075. PATENTED JUNE 30, 1908.
A. O'BRIEN.
TIRE.
APPLICATION FILED MAY 23, 1907.
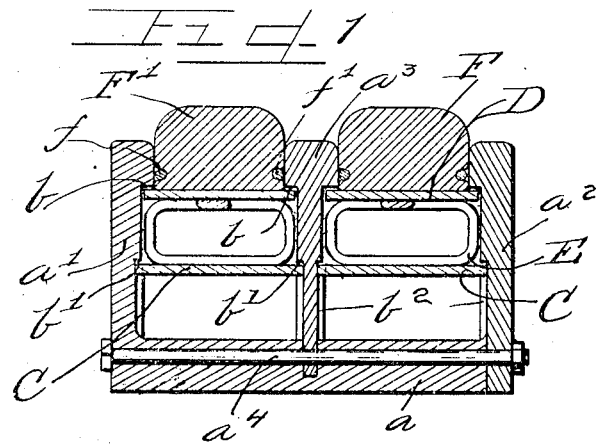
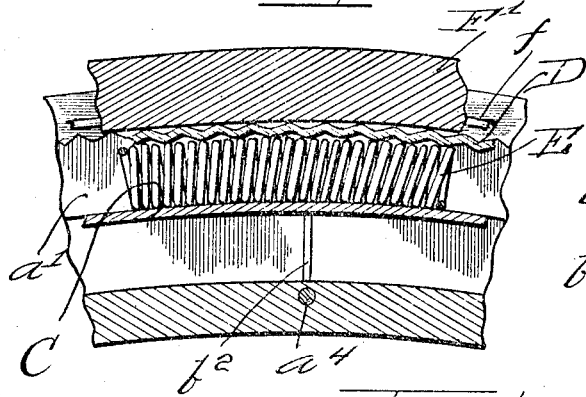
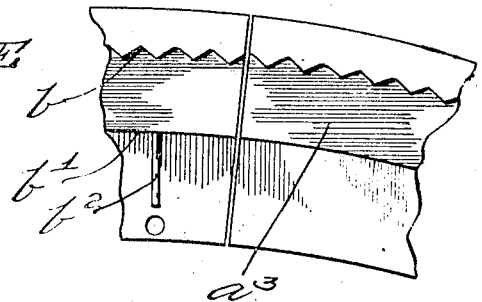
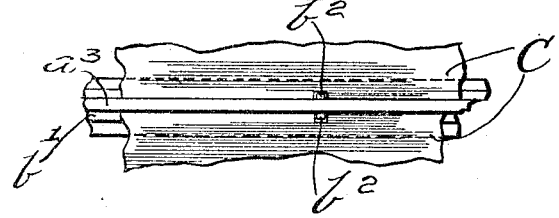
WITNESSES
INVENTOR
Arthur O'Brien

UNITED STATES PATENT OFFICE.

ARTHUR O'BRIEN, OF CHICAGO, ILLINOIS, ASSIGNOR OF ONE-HALF TO FRANK P. McGINN, OF CHICAGO, ILLINOIS.

TIRE.

No. 892,075.    Specification of Letters Patent.    Patented June 30, 1908.

Application filed May 23, 1907. Serial No. 375,295.

*To all whom it may concern:*

Be it known that I, ARTHUR O'BRIEN, a citizen of the United States, and a resident of the city of Chicago, county of Cook, and State of Illinois, have invented certain new and useful Improvements in Tires; and I do hereby declare that the following is a full, clear, and exact description of the same, reference being had to the accompanying drawings, and to the letters of reference marked thereon, which form a part of this specification.

This invention relates to improvements in tires.

Pneumatic tires as constructed while affording the desired amount of resiliency are easily punctured and are always short lived making them very expensive to maintain.

It is an object of this invention to provide a tire of equal or greater resiliency than a pneumatic tire but in which the use of air is avoided thus providing a punctureless tire.

It is a further object of the invention to provide a cheap and durable tire easily assembled and efficient in operation.

The invention consists in the matters hereinafter described and more fully pointed out and defined in the appended claims.

In the drawings: Figure 1 is a transverse section of a device embodying my invention. Fig. 2 is an enlarged section taken longitudinally of the tire with one of the springs in full lines. Fig. 3 is a fragmentary side elevation of the separating ring. Fig. 4 is a fragmentary bottom plan view of the separating ring and inner band or ring.

As shown in said drawings: The felly may be made of wood, steel, or other suitable material and secured thereon is the rim which comprises a circular bottom band $a$ integral with which is a side flange $a'$ which is directed outwardly and affords part of the retaining means for the tire. Rigidly bolted to the opposite side of said rim $a$ is a removable side flange $a^2$ corresponding with the flange $a'$. A separating ring or plate $a^3$ is secured in a central peripheral groove in the rim by means of the bolts $a^4$ which secures the removable flange $a^2$ in position thus dividing the channel formed by the flanges to afford two equal channels.

The inner faces of the flanges $a'$ and $a^2$ and the faces of the separating or dividing ring are provided near the periphery with a concentric shoulder $b$ corrugated on its under side and a shoulder $b'$, intermediate the same and the rim $a$. Loosely secured beneath the shoulder $b'$ is a resilient ring or band of steel or other spring metal C of a width slightly less than the width of the channel and the circumference of which is less than that of the perimeter of the shoulder. As shown said band is provided with notches to receive the ribs $b^2$ integral with the flanges $a'$—$a^2$ and the separating ring $a^3$.

A corrugated band or ring of spring metal D engages inside of the corrugated shoulders $b$, and like the ring C is adapted to fit loosely in the channel, and a flat coiled spring E is secured between said bands or rings C—D.

Secured in the channels around the corrugated spring band D, are solid rubber treads F—F' provided with side binding wires $f$—$f'$, as shown in Fig. 1.

The operation is as follows: The tire is assembled with the spring bands C and D, secured within the respective shoulders and the tread secured in the channel to project the desired distance beyond the flanges and the tension wires prevent the same from leaving the channel. Inasmuch as said bands are secured loosely in the channels or in other words are of a diameter less than the diameter of the respective shoulders, pressure on the tread contacting the ground permits the bands to give upwardly and the sides of the bands to yield outwardly until contacting the shoulders producing the desired degree of resiliency which of course may be regulated by the size of the resilient bands. The ribs $b^2$ prevent the band C from moving relatively of the plates and the corrugated shoulders effectively prevent relative movement of the resilient band D or ribs may also be provided.

When desired for vehicles of narrow tread it is of course obvious that the tire may be made with only one channel or that any desired number of channels may be provided. It may further be desirable to use either the corrugated or the plain resilient bands singly with the rubber treads and to entirely eliminate the use of the coiled spring. In this case only one shoulder is necessary greatly simplifying the construction. I therefore do not purpose limiting this application otherwise than necessitated by the prior art as the arrangement of parts and details of construction may be varied without departing from the principles of this invention.

I claim as my invention:

1. A resilient tire comprising a channeled felly having side flanges, a plain spring band or ring fitting loosely in the channel, a rubber tread fitted in the channel and extending beyond the flanges and resilient means between the tread and spring band.

2. A resilient tire comprising a rim having a channel therein, oppositely disposed corrugated shoulders extending around the channel, a corrugated resilient band or ring of metal fitting loosely in the channel within the shoulder and a rubber tread secured against the band.

3. A device of the class described comprising a channeled rim of inwardly directed shoulders extending around the channel, a resilient corrugated band of metal engaged in the channel within one shoulder, a resilient band of plain metal engaged in the channel within the other shoulder, resilient means therebetween and a resilient tread against which one of said bands bears.

4. A resilient tire embracing a rim affording channels, oppositely disposed inwardly directed shoulders on the flanges thereof, a resilient band of metal in each channel within the shoulder adapted to yield upwardly and outwardly when pressure is applied on one side thereof, a rubber tread for said tire coacting with said band and means preventing relative rotation of the rim and resilient bands.

5. In a device of the class described the combination with a rim embracing a channel of a separating ring dividing the same peripherally providing a plurality of channels, a corrugated resilient metallic band in each channel, a resilient metallic band therein, intermediate the same and base of the channel, a coiled spring between said bands, a rubber tread for each channel outside the outer band and retaining wires for each rubber tread.

6. A resilient tire comprising a felly affording a channel, a resilient spring band in said channel adapted to yield upwardly, means retaining the band in the channel, a resilient tread secured in and extending beyond the periphery of the felly and ribs rigidly secured to the flanges to prevent relative movement of the band and felly.

7. In a device of the class described a felly having side flanges affording a channel therebetween and one of the flanges being removable, means rigidly securing the removable flange to the felly, inwardly facing shoulders provided by said flanges, bands of resilient metal in the channel one loosely engaged beneath each shoulder, resilient means between the shoulders and a rubber tread extending beyond the flanges.

In testimony whereof I have hereunto subscribed my name in the presence of two subscribing witnesses.

ARTHUR O'BRIEN

Witnesses:
K. E. HANNAH,
L. REIBSTEIN.